United States Patent
Ikari

(10) Patent No.: US 10,445,031 B2
(45) Date of Patent: Oct. 15, 2019

(54) IMAGE FORMING SYSTEM AND PRINT LOG MANAGEMENT METHOD

(71) Applicant: Konica Minolta, Inc., Tokyo (JP)

(72) Inventor: Hiroki Ikari, Hino (JP)

(73) Assignee: Konica Minolta, Inc., Tokyo (JP)

(*) Notice: Subject to any disclaimer, the term of this patent is extended or adjusted under 35 U.S.C. 154(b) by 0 days.

(21) Appl. No.: 15/809,526

(22) Filed: Nov. 10, 2017

(65) Prior Publication Data

US 2018/0136884 A1    May 17, 2018

(30) Foreign Application Priority Data

Nov. 11, 2016  (JP) ................... 2016-220995

(51) Int. Cl.
 *G06F 3/12* (2006.01)
 *H04N 1/32* (2006.01)
 (Continued)

(52) U.S. Cl.
 CPC .......... *G06F 3/1222* (2013.01); *G06F 3/1203* (2013.01); *G06F 3/1238* (2013.01); *G06F 3/1273* (2013.01); *G06F 3/1285* (2013.01); *G06F 21/34* (2013.01); *G06F 21/608* (2013.01); *H04L 9/0897* (2013.01); *H04N 1/32128* (2013.01); *H04N 1/442* (2013.01); *G06F 21/32* (2013.01); *G06F 2221/2101* (2013.01);
 (Continued)

(58) Field of Classification Search
 None
 See application file for complete search history.

(56) References Cited

U.S. PATENT DOCUMENTS

| | | | | |
|---|---|---|---|---|
| 2007/0103715 A1* | 5/2007 | Nakata | ............... | G06F 3/1203 358/1.14 |
| 2008/0162941 A1* | 7/2008 | Tomita | ............... | G06F 21/608 713/182 |

(Continued)

FOREIGN PATENT DOCUMENTS

| | | | | |
|---|---|---|---|---|
| CN | 1959695 A | | 5/2007 | |
| GB | 2403382 A | * | 12/2004 | ............. G06F 21/10 |
| JP | 2014-13474 A | | 1/2014 | |

OTHER PUBLICATIONS

Chinese Office Action issued in corresponding Chinese Application No. 201711096614.4, dated Mar. 21, 2019 (32 pages).

*Primary Examiner* — Miya J Williams
(74) *Attorney, Agent, or Firm* — Osha Liang LLP

(57) ABSTRACT

An image forming system includes: an ID terminal that stores a public key and a secret key and that outputs the public key and the secret key to an external device when the ID terminal authenticates a user; an image forming apparatus that prepares a log data relating to printing; a storing device that stores the log data prepared by the image forming apparatus; an information processing device that authenticates the user by using the ID terminal; and a log viewing device that authenticates the user by using the ID terminal. When the information processing device receives a print instruction for printing a predetermined print data from the authenticated user, the information processing device transmits a print job to which the public key obtained from the ID terminal is added, to the image forming apparatus. The image forming apparatus receives the print job to which the public key is added.

14 Claims, 14 Drawing Sheets

(51) Int. Cl.
*H04N 1/44* (2006.01)
*G06F 21/32* (2013.01)
*G06F 21/34* (2013.01)
*H04L 9/08* (2006.01)
*G06F 21/60* (2013.01)

(52) U.S. Cl.
CPC ............... *H04N 2201/0094* (2013.01); *H04N 2201/3202* (2013.01)

(56) References Cited

U.S. PATENT DOCUMENTS

| | | | |
|---|---|---|---|
| 2009/0284785 A1* | 11/2009 | Bando | G06F 21/608 358/1.15 |
| 2011/0026066 A1* | 2/2011 | Akita | G06F 21/608 358/1.14 |
| 2011/0085204 A1* | 4/2011 | Hamada | H04N 1/387 358/1.15 |
| 2013/0208299 A1* | 8/2013 | Doui | G06K 15/4095 358/1.14 |
| 2015/0304851 A1* | 10/2015 | Chen | H04W 4/80 713/172 |
| 2016/0021264 A1* | 1/2016 | Takeuchi | H04N 1/00307 358/1.15 |
| 2017/0041789 A1* | 2/2017 | Waldron | G06K 19/0716 |
| 2017/0104890 A1* | 4/2017 | Miyazaki | A61B 5/01 |
| 2017/0257493 A1* | 9/2017 | Kawano | G06F 21/44 |
| 2018/0074761 A1* | 3/2018 | Yamaguchi | G06F 3/1236 |
| 2018/0075396 A1* | 3/2018 | Nakajima | G06Q 10/063114 |

\* cited by examiner

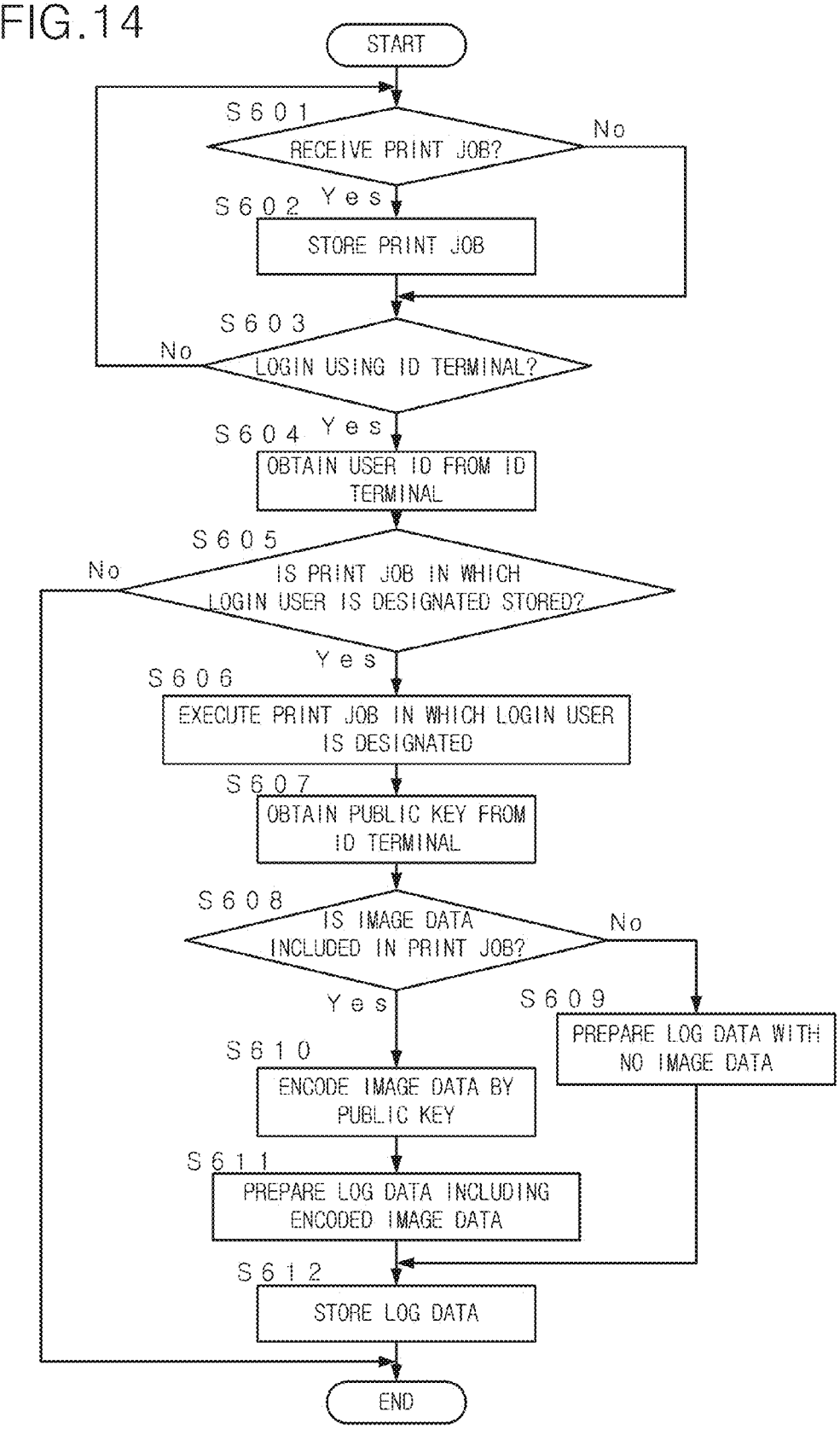

IMAGE FORMING SYSTEM AND PRINT LOG MANAGEMENT METHOD

CROSS-REFERENCE TO RELATED APPLICATIONS

Japanese Patent Application No. 2016-220995 filed on Nov. 11, 2016, including description, claims, drawings, and abstract the entire disclosure is incorporated herein by reference in its entirety.

BACKGROUND

Technical Field

The present invention relates to an image forming system and a print log management method which can output the print log including the image.

Description of the Related Art

In recent years, like a nomad worker or the like, working styles or life styles have been diversified. In such a situation, the styles of the offices have been also diversified. In addition to the style in which persons work in the predetermined office, the style in which each person works in a friendly working environment or place by using a rental office, a shared office, co-working space and the like, is popularized.

In not an office of the company, but a rental office or a shared office in which the persons belonging to various companies work by temporarily renting the working space in the same place, various equipments, such as an image forming apparatus and the like, are provided. A user of the rental office or the like, can use these equipments by paying the charge fee. In general, an administrator of the rental office charges each user the charge fee a month or the like, for the use of the equipment by referring to the print history information (log data) stored in the equipment.

On the other hand, in an image forming apparatus, in order to save the print history in detail, the image log including the image of the printed document is stored. However, there are some cases in which the confidential information is included in the image included in the image log. When an administrator of the rental office views this image log in order to calculate the charge fee which is charged to each user, there is some possibility that the confidential information is leaked from the image log.

In Japanese Patent Application Publication No. 2014-013474, the following image forming apparatus is disclosed. In the image forming apparatus, the portion to be concealed in the image log is specified in accordance with the set concealment condition and the image log is stored after the specified portion is encoded. In case that the administrator having the viewing right for viewing the concealed portion views the image log, the encoded concealed portion is decoded and the decoded portion is displayed in the original state. On the other hand, in case that the administrator who does not have the viewing right for viewing the concealed portion views the image log, the encoded concealed portion is displayed by masking the concealed portion.

In the technology disclosed in Japanese Patent Application Publication No. 2014-013474, it is troublesome to set the concealed portion individually. Further, because the person having the viewing right is only an administrator, it is sufficient to use a specific secret key which can be used only by the administrator. However, in order to handle the above-described request, that is, the request in which a user who prints the document can view the log including the concealed portion, but an administrator can view only the portion of the log except the concealed portion, it is necessary to set the encoding process for each user in order to encode the portion to be concealed in the log data so that only the user can decode the encoded portion. It is difficult to manage the encoding and decoding of the log.

SUMMARY

An image forming system and a print log management method in accordance with one or more embodiments of the invention can prepare the log in which the concealed portion is encoded so that only a person who prints the document can decode the encoded portion.

According to one or more embodiments of the present invention, an image forming system comprises:

an ID terminal that stores a public key and a secret key and that outputs the public key and the secret key to an external device when the ID terminal authenticates that a user is a predetermined user;

an image forming apparatus that prepares a log data relating to a printing;

a storing device that stores the log data prepared by the image forming apparatus;

an information processing device that authenticates the user by using the ID terminal; and a log viewing device that authenticates the user by using the ID terminal, wherein when the information processing device receives a print instruction for printing a predetermined print data from the user who is successfully authenticated by using the ID terminal, the information processing device transmits a print job to which the public key obtained from the ID terminal is added, to the image forming apparatus, the image forming apparatus which receives the print job to which the public key is added, executes the printing in accordance with the print job, further, the image forming apparatus creates an encoded image data by encoding an image data included in the print job by using the public key, prepares the log data including the encoded image data and stores the log data in the storing device, and the log viewing device obtains the log data to be viewed by the user who is successfully authenticated by using the ID terminal, from the storing device, decodes the encoded image data included in the log data by using the secret key obtained from the ID terminal, and outputs log information including an image obtained by decoding the encoded image data, as the log information based on the log data.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 14 is a flowchart showing the process which is carried out by the image forming apparatus which receives the print job from the information processing device according to the second embodiment.

DETAILED DESCRIPTION OF EMBODIMENTS

Hereinafter, embodiments of the present invention will be described with reference to the drawings. However, the scope of the invention is not limited to the disclosed embodiments.

Figure 1:
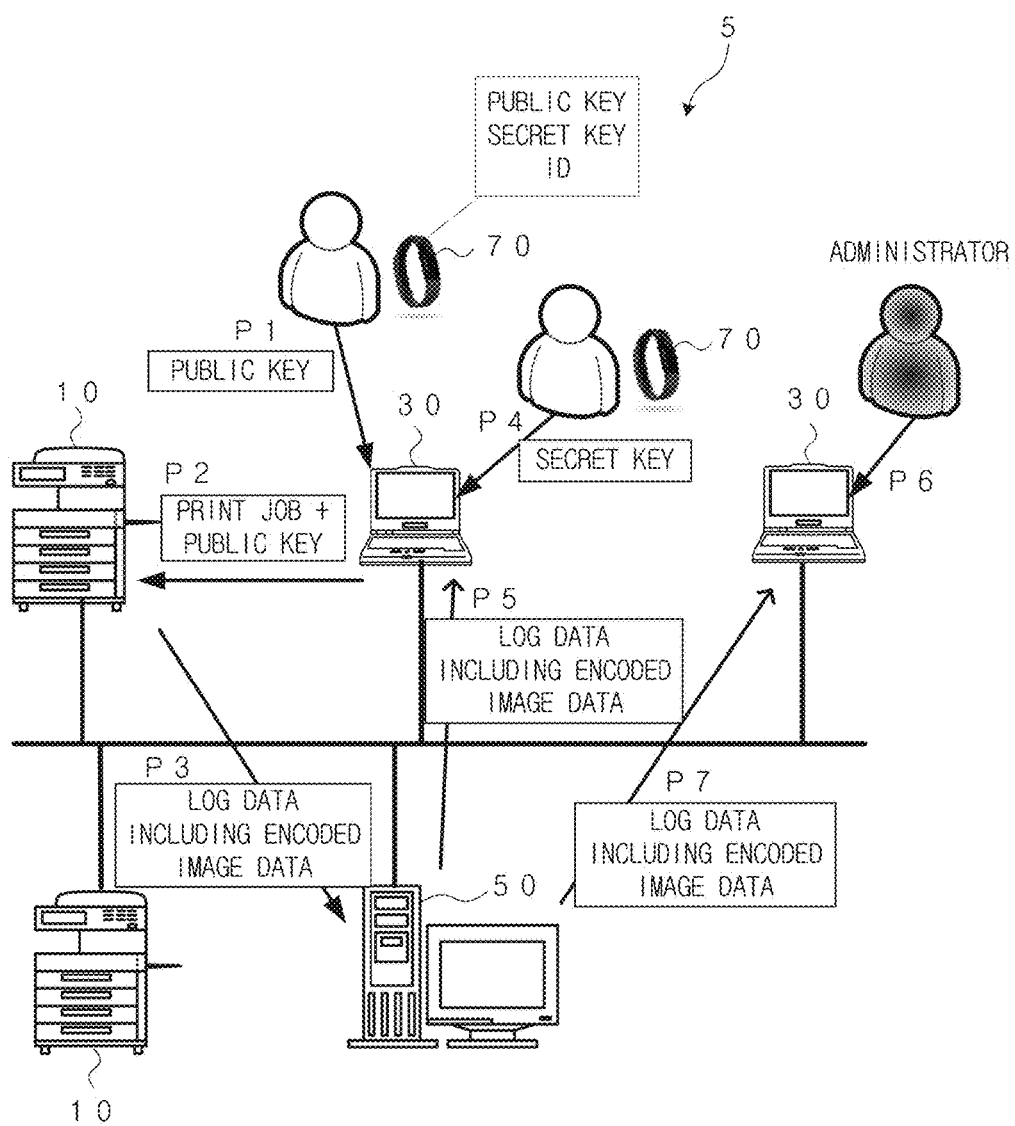
FIG. 1 is a view showing an example of the image forming system according to a first embodiment.

FIG. 1 is a view showing a configuration example of the image forming system 5 according to the first embodiment. The image forming system 5 comprises one or more image forming apparatuses 10, one or more information processing devices 30 to be used by users or an administrator, such as personal computers (hereinafter, also referred to as PC), a log storing server 50, ID terminals 70 used for the user authentication and the like. The image forming apparatuses 10, the information processing devices 30 and the log storing server 50 are connected so as to be communicable with each other via a network, such as LAN (Local Area Network) or the like. In one or more embodiments of the present invention, an administrator is, for example, a person who manages the rental fee (charge) of each image forming apparatus in a rental office or the like.

The ID terminal 70 has the function for authenticating that a user is the predetermined user or not in accordance with the biological information or the like of the user (personal authentication). The ID terminal 70 stores the public key and the secret key which are unique to the user to be authenticated and the user ID. The ID terminal 70 has the function for outputting them to an external device via a near-field wireless communication or the like when the personal authentication is successful. The biological information is optional information, such as a vein, a finger print, a pulse or the like. For example, the ID terminal 70 is worn on the user's wrist or the like, or is held on the user's hand, and authenticates the user only when the ID terminal 70 is worn or is held. Alternatively, as long as the personal authentication can be carried out only when the ID terminal 70 is worn, held or carried, the personal authentication may be carried out in accordance with the information except the biological information.

The information processing device 30 has the function for authenticating the user by using the ID terminal 70. Further, the information processing device 30 has the function for obtaining the public key from the ID terminal 70, preparing the print job to which the obtained public key is added and transmitting the print job to the image forming apparatus 10 when the information processing device 30 receives the print instruction for printing the image in accordance with the print data from the user in the situation in which the user authentication carried out by the ID terminal 70 is successful (in which the user logs in the information processing device 30 by using the ID terminal 70). The information processing device 30 may be a desktop PC, note-type of PC or a portable terminal, such as a tablet, a smart phone or the like.

The image forming apparatus 10 is a so-called multi function peripheral having the function for executing jobs, such as a copy job for obtaining image data by optically reading an original using a scanner to print out the image of the original on a recording sheet in accordance with the obtained image data, a storing job for storing the image data of the read original as a file or the like, a transmission job for transmitting the image data of the read original as a file or the like to an external device, a print job for printing out an image on the recording sheet in accordance with the print data received from the information processing device 30, a FAX job for transmitting and receiving the image data in accordance with the facsimile procedure, and the like. Hereinafter, the image forming apparatus 10 is also referred to as MFP. The image forming apparatus 10 may be a printer having the function for executing only the print job. Further, the image forming apparatus 10 has the function for authenticating the user by using the ID terminal 70.

The image forming apparatus 10 prepares the log data (print history information) relating to the execution of the print job when the print job is executed and transmits the log data to the log storing server 50. The log data includes the image data included in the print job in the situation in which the image data is encoded. The image data which is encoded is referred to as the encoded image data. The image data is encoded by using the public key which is added to the print job.

The log storing server 50 is a computer having the communication function, and in the log storing server 50, the predetermined program is installed. The log storing server 50 has the function for storing the log data received from the image forming apparatus 10. Further, the log storing server 50 has the function for transmitting the log data to an external device, such as the information processing device 30 or the like, according to the request from the external device.

The information processing device 30 has the function as the log viewing device for displaying the log information in accordance with the log data by downloading the log data from the log storing server 50. Specifically, when the information processing device 30 receives the viewing instruction for viewing the log data from a user (login user) in the situation in which the user authentication carried out by the ID terminal 70 is successful (in the situation in which the user logs in the information processing device 30 by using the ID terminal 70), the information processing device 30 obtains the log data to be viewed in accordance with the viewing instruction, from the log storing server 50. Then, the information processing device 30 decodes the encoded image data included in the obtained log data by using the secret key obtained from the ID terminal 70 used for the login and outputs the log information including the decoded image as the log information based on the obtained log data.

In the image forming system 5, the process for executing the printing and storing and viewing the log data is carried out in accordance with the following sequence.

A user logs in any one of the information processing device 30 by using the user's ID terminal 70. When the user designates the print data to be used for the printing and the image forming apparatus 10 as the print destination, the information processing device 30 reads the public key from the user's ID terminal 70 used for the login (P1). The information processing device 30 transmits the print job for printing the designated print data to the image forming apparatus 10 designated as the print destination (P2). At this time, the read public key is added to the print job.

The image forming apparatus 10 which receives the print job to which the public key is added, executes the printing in accordance with the received print job. In case that the image data is included in the print job, the image forming apparatus 10 creates the encoded image data by encoding the image data using the public key which is added to the print job, and prepares the log data including the encoded image data. Then, the image forming apparatus 10 transmits the log data to the log storing server 30 (P3).

In case that the user confirms the log data relating to the printing, the user logs in any one of the information processing device 30 by using the user's ID terminal 70. When the user designates the log data to be viewed, the information processing device 30 reads the secret key from the user's ID terminal 70 used for the login (P4). Then, the information processing device 30 downloads the designated log data from the log storing server 50, and decodes the encoded image data included in the log data by using the read secret key (P5).

In case that the decoding of the encoded image data is successful, the information processing device 30 displays the log information including the decoded image as the log information based on the log data (P5). On the other hand, in case that the encoded image data included in the log data cannot be decoded by using the secret key read from the ID terminal 70, the information processing device 30 displays the log information which does not include the image, as the log information based on the log data.

In case that an administrator logs in the information processing device 30 and views the log information by downloading the log data of each user from the log storing server 50 (P6), because the administrator does not have the secret key corresponding to the public key which is used by each user and cannot decode the encoded image data, the administrator views the log information which does not include the image (P7). The method in which the administrator logs in the information processing device 30, is not limited to the method in which the ID terminal 70 is used. An optional method for logging in the information processing device 30 may be used.

Figure 2:
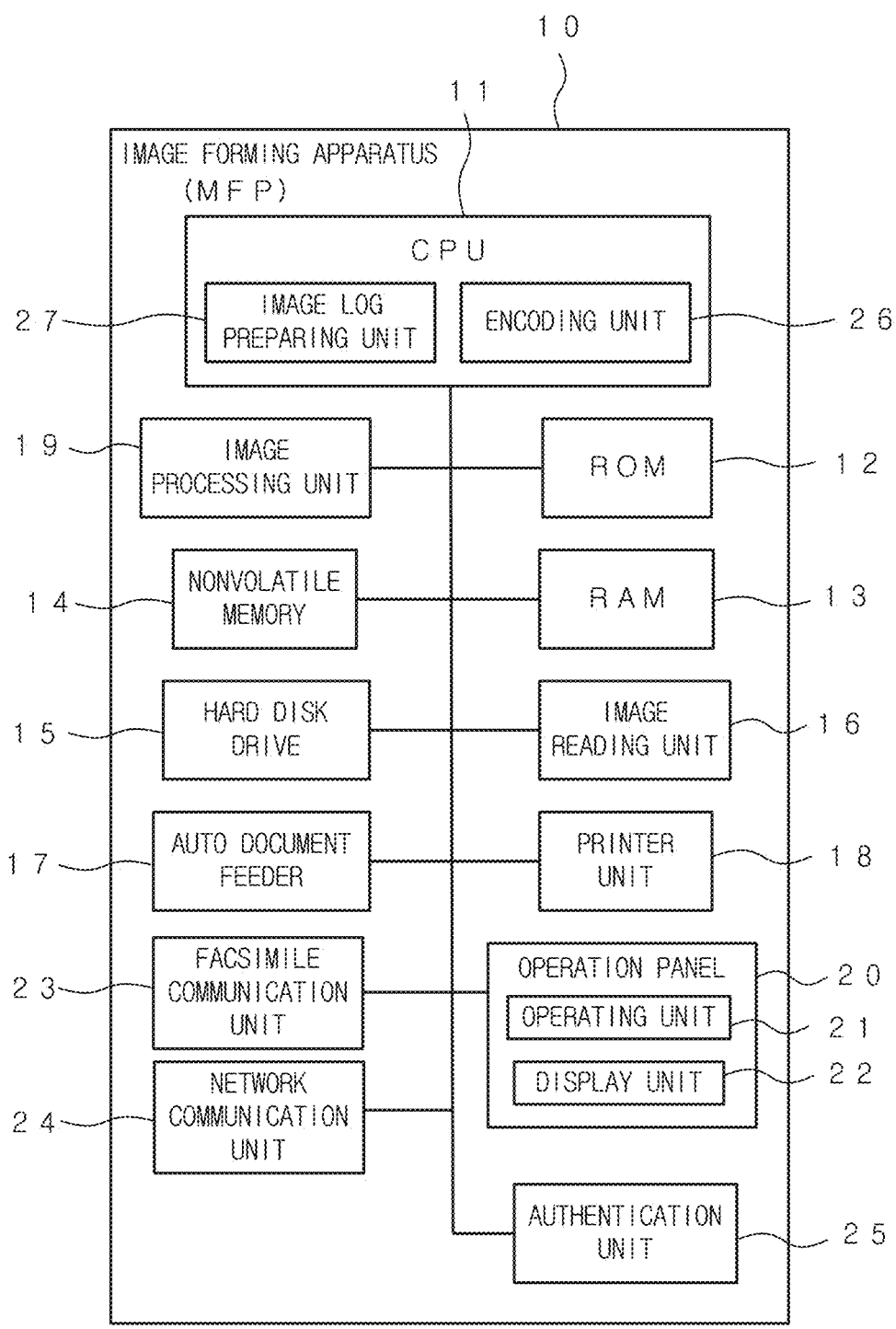
FIG. 2 is a block diagram showing the schematic configuration of the image forming apparatus according to the first embodiment.

FIG. 2 is a block diagram showing the schematic configuration of the image forming apparatus 10. The image forming apparatus 10 comprises a CPU (Central Processing Unit) 11 for entirely controlling the operation of the image forming apparatus 10. The CPU 11 is connected with a ROM (Read Only Memory) 12, a RAM (Random Access Memory) 13, a nonvolatile memory 14, a hard disk drive 15, an image reading unit 16, an auto document feeder (ADF) 17, a printer unit 18, an image processing unit 19, an operation panel 20, a facsimile communication unit 23, a network communication unit 24, an authentication unit 25 and the like via a bus. The operation panel 20 comprises an operating unit 21 and a display unit 22.

By the CPU 11, a middleware, application programs and the like are executed on an OS (Operating System) program as a base. In the ROM 12 various types of programs are stored. By executing various types of processes by the CPU 11 in accordance with these programs, each function of the image forming apparatus 10 is realized.

The RAM 13 is used as a work memory for temporarily storing various data when the CPU 11 executes the process in accordance with the programs, and as an image memory for storing the image data, and the like.

The nonvolatile memory 14 is a memory (flash memory) in which the stored contents are not damaged even if the image forming apparatus 10 is turned off, and is used for storing various types of settings. Further, in the nonvolatile memory 14, the user information used for the user authentication using the ID terminal 70 and the like, is stored.

The hard disk drive 15 is a large-capacity nonvolatile memory device. In the hard disk drive 15, various types of application programs and data are stored in addition to print data, image data, and the like.

The image reading unit 16 has the function for obtaining image data by optically reading an image of an original. For example, the image reading unit 16 comprises a light source for irradiating an original with light, a line image sensor for reading the original line by line in the width direction of the original by receiving the reflected light from the original, a moving unit for sequentially moving the reading position line by line in the longitudinal direction of the original, an optical system having lenses, mirrors, and the like for guiding the reflected light from the original to the line image sensor and focusing the reflected light on the line image sensor, a converting unit for converting an analog image signal outputted from the line image sensor into digital image data, and the like.

The auto document feeder 17 has the function for conveying the original by feeding the original set to the original setting tray from the top sheet one by one, passing the original through the reading position of the image reading unit 16 and discharging the original to a predetermined discharge position. The image reading unit 16 has the function for reading the original set on a platen glass, and has the function for sequentially reading the original which is conveyed by the auto document feeder 17.

The printer unit 18 has the function for forming an image on the recording sheet in accordance with the image data. In one or more embodiments of the present invention, the printer unit 18 is configured as a so-called laser printer which comprises a conveying device for the recording sheet, a photoconductive drum, a charging device, a laser unit, a developing device, a transfer and separation device, a cleaning device and the fixing device, and which forms an image by the electrophotographic process. Alternatively, an image may be formed by another type of printer.

The image processing unit 19 carries out the rasterizing process for converting print data into image data, the compression/decompression process for the image data, and the like in addition to the processings, such as the enlargement/reduction or the rotation of image data.

The operation panel 20 comprises the operation unit 21 and the display unit 22. The display unit 22 has the function for displaying various types of operation windows, setting windows and the like, and comprises a liquid crystal display or the like. The operating unit 21 receives various types of operations from a user, and comprises various types of hardware keys, such as a start button, a numeric keypad and the like, and a touch screen provided on the display surface of the display unit 22.

The facsimile communication unit 23 has the function for transmitting and receiving the image data to/from an external device having the facsimile function via a public line.

The network communication unit 24 has the function for communicating with the information processing device 30 and the log storing server 50 via the network.

The authentication unit 25 has the function for communicating with the ID terminal 70 and for authenticating the user by using the ID terminal 70. The authentication unit 25 carries out the user authentication by receiving the user ID transmitted by the ID terminal 70.

The CPU 11 has the function as the encoding unit 26 and the image log preparing unit 27. The encoding unit 26 encodes the image data included in the print data by using the public key obtained from the ID terminal 70, and creates the encoded image data. The image log preparing unit 27 prepares the log data relating to the printing which is executed by the printer unit 18. In the log data, the encoded image data prepared by the encoding unit 26 is included.

Figure 3:
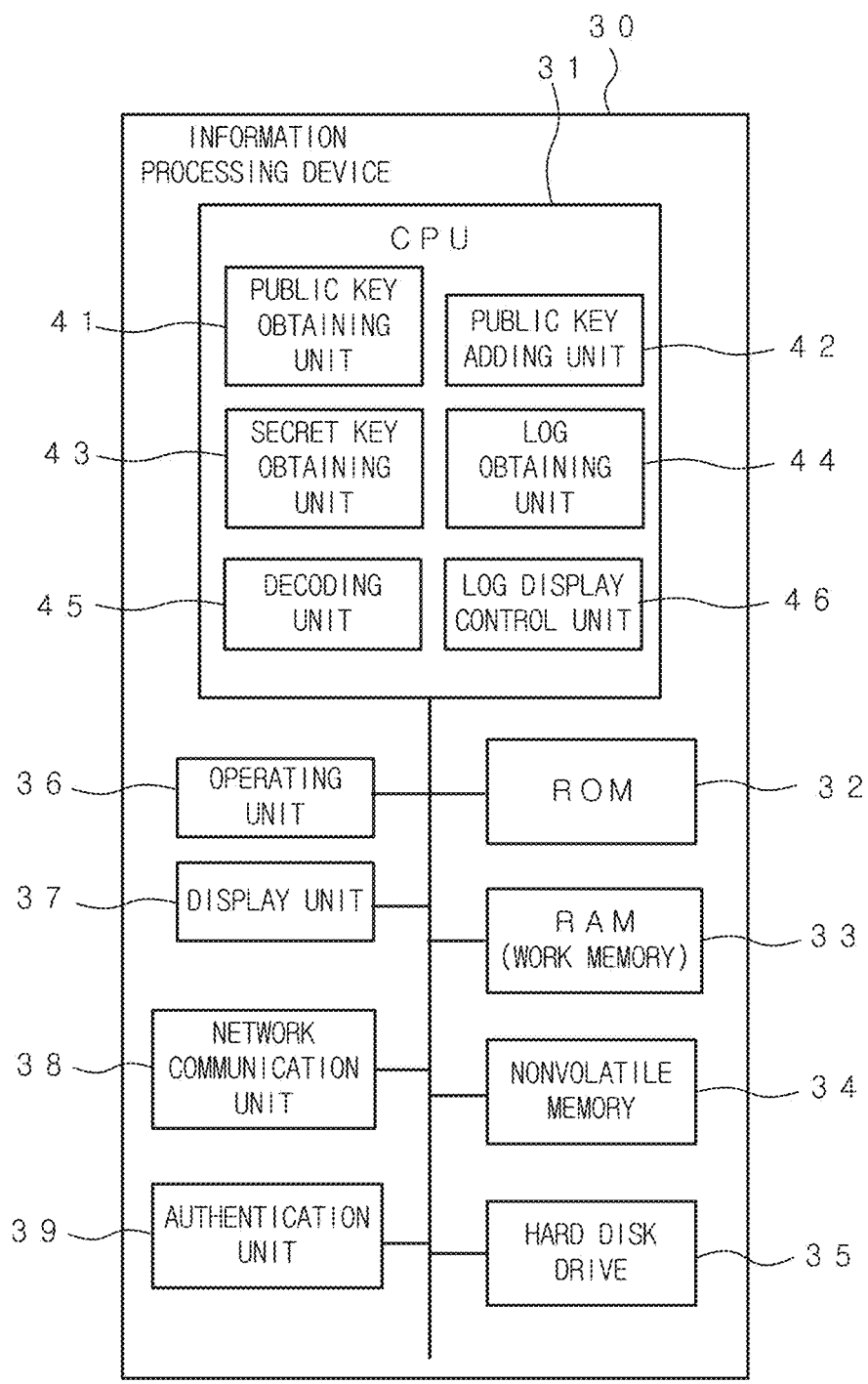
FIG. 3 is a block diagram showing the schematic configuration of the information processing device according to the first embodiment.

FIG. 3 is a block diagram showing the schematic configuration of the information processing device 30. The information processing device 30 comprises a CPU 31 for entirely controlling the operation of the information processing device 30. The CPU 31 is connected with a ROM 32, a RAM 33, a nonvolatile memory 34, a hard disk drive 35, an operating unit 36, a display unit 37, a network communication unit 38, an authentication unit 39 and the like via a bus. The information processing device 30 may be a general-purpose PC or the like.

By the CPU 31, a middleware, application programs and the like are executed on an OS program as a base. In the ROM 32 various types of programs are stored. By executing various types of processes by the CPU 31 in accordance with these programs, each function of the information processing device 30 is realized.

The RAM 33 is used as a work memory for temporarily storing various data when the CPU 31 executes the process in accordance with the programs, and the like.

The nonvolatile memory 34 is a memory (flash memory) in which the stored contents are not damaged even if the information processing device 30 is turned off, and is used for storing various types of settings.

The hard disk drive 35 is a large-capacity nonvolatile memory device. In the hard disk drive 35, various types of application programs and data are stored. Further, in the hard disk drive 35, the print data to be printed, such as a document, a file and the like, is stored.

The network communication unit 38 has the function for communicating with various types of external devices, such as the image forming apparatus 10, the log storing server 50 and the like, via the network.

The display unit 37 has the function for displaying various types of operation windows, setting windows and the like. The operating unit 36 has the function for receiving various types of operations from a user.

The authentication unit 39 has the function for communicating with the ID terminal 70 and for authenticating the user by using the ID terminal 70, like the authentication unit 25 of the image forming apparatus 10.

The CPU 31 has the function as the public key obtaining unit 41, the public key adding unit 42, the secret key obtaining unit 43, the log obtaining unit 44, the decoding unit 45, the log display control unit 46 and the like.

The public key obtaining unit 41 obtains the public key from the ID terminal 70. The public key adding unit 42 has the function for adding the public key to the print job. The secret key obtaining unit 43 obtains the secret key from the ID terminal 70. The log obtaining unit 44 obtains the log data from the log storing server 50. The decoding unit 45 decodes the encoded image data included in the log data by using the secret key obtained from the ID terminal 70. The log display control unit 46 has the function for preparing the log information in accordance with the log data obtained from the log storing server 50 and the image obtained by decoding the encoded image data included in the obtained log data, and for displaying the log information.

Figure 4:
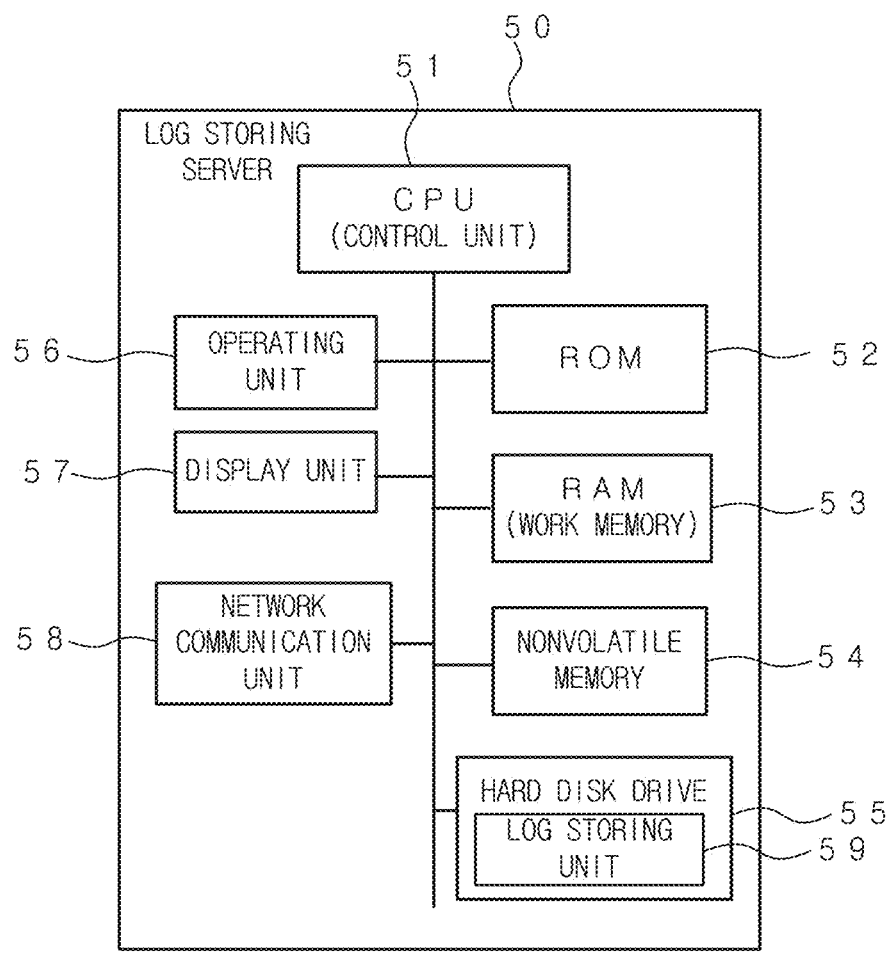
FIG. 4 is a block diagram showing the schematic configuration of the log storing server according to the first embodiment.

FIG. 4 is a block diagram showing the schematic configuration of the log storing server 50 according to the first embodiment. The log storing server 50 comprises a CPU 51 as the control unit for entirely controlling the operation of the log storing server 50. The CPU 51 is connected with a ROM 52, a RAM 53, a nonvolatile memory 54, a hard disk drive 55, an operating unit 56, a display unit 57, a network communication unit 58 and the like, via a bus.

By the CPU 51, a middleware, application programs and the like are executed on an OS program as a base. In the ROM 52 various types of programs are stored. By executing various types of processes by the CPU 51 in accordance with these programs, each function of the log storing server 50 is realized.

The RAM 53 is used as a work memory for temporarily storing various data when the CPU 51 executes the process in accordance with the programs, and the like.

The nonvolatile memory 54 is a memory (flash memory) in which the stored contents are not damaged even if the log storing server 50 is turned off, and is used for storing various types of settings.

The hard disk drive 55 is a large-capacity nonvolatile memory device. In the hard disk drive 55, various types of application programs and data are stored. Further, the hard disk drive 55 functions as the log storing unit 59 for storing the log data received from the image forming apparatus 10.

The display unit 57 has the function for displaying various types of operation windows, setting windows and the like. The display unit 57 comprises a liquid crystal display and the like. The operating unit 56 has the function for receiving various types of operations from a user. The operating unit 56 comprises a keyboard for receiving the entry of the text, the number, the mark and the like, a touch screen provided on the display surface of the display unit 57, and the like. The touch screen detects the coordinate position on which the contact operation is carried out for the display surface of the display unit 57 by a touch pen, a user's finger or the like.

The network communication unit 58 has the function for communicating with the image forming apparatus 10, the information processing device 30, other various types of external devices and the like, via the network.

Figure 5:
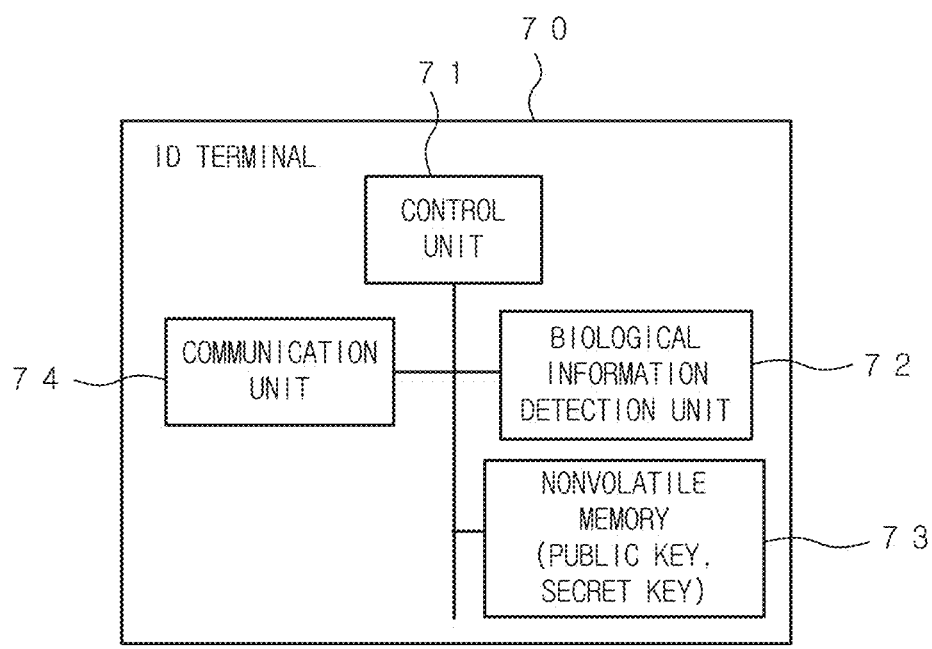
FIG. 5 is a block diagram showing the schematic configuration of the ID terminal according to the first embodiment.

FIG. 5 is a block diagram showing the schematic configuration of the ID terminal 70. The ID terminal 70 comprises a control unit 71 for entirely controlling the operation of the ID terminal 70. The control unit 71 is configured by a CPU, a ROM, a RAM and the like as the main part. The control unit 71 operates in accordance with the programs stored in the ROM. The control unit 71 is connected with a biological information detection unit 72, a nonvolatile memory 73, a communication unit 74, and the like.

The biological information detection unit 72 obtains the biological information of the user who wears, holds or carries the ID terminal 70. The nonvolatile memory 73 is a memory (flash memory) in which the stored contents are not damaged even if the ID terminal 70 is turned off. In the nonvolatile memory 73, the ID which is unique to the ID terminal 70 (the user ID of the owner), the public key which is unique to the ID terminal 70 and the secret key corresponding to the public key, are stored.

The communication unit 74 has the function for transmits the public key, the secret key and the user ID via the near-field wireless communication or the like.

The control unit 71 carries out the user authentication for judging whether the user who holds or the like the ID terminal 70 is the predetermined user by using the biological information obtained by the biological information detection unit 72. The ID terminal 70 can transmit the public key, the secret key and the user ID to an external device only when the user authentication is successful.

Next, the process for executing the printing and viewing the log by each device in the image forming system 5 according to the first embodiment is explained.

Figure 6:
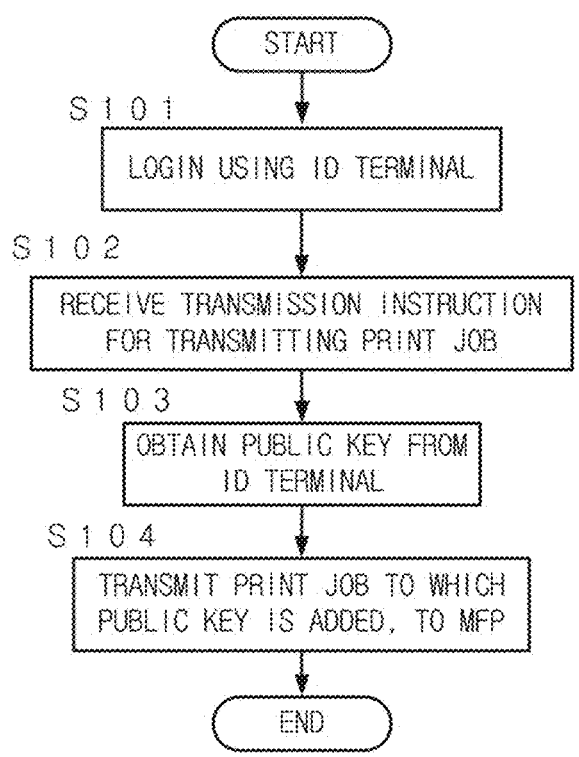
FIG. 6 is a flowchart showing the process relating to the transmission of the print job, which is carried out by the information processing device according to the first embodiment.

FIG. 6 is a flowchart chart showing the process relating to the transmission of the print job, which is carried out by the information processing device 30. When the information processing device 30 receives the login operation using the ID terminal 70 from the user, the information processing device 30 receives the user ID from the ID terminal 70 and accepts the login of the user having the received user ID (Step S101).

The information processing device 30 receives the designation of the print data to be printed and the image forming apparatus 10 as the print destination, and further receives the print instruction for printing the designated print data from the user who logs in the information processing device 30 by using the ID terminal 70 (Step S102). Then, the information processing device 30 obtains the public key from the ID terminal 70 of the user who logs in (Step S103), and prepares the print job for printing the designated print data to be printed.

Further, the information processing device 30 adds the obtained public key to the print job, and transmits the print job to which the public key is added, to the image forming apparatus 10 designated as the print destination (Step S104). Alternatively, the information processing device 30 may obtain the public key from the ID terminal 70 when the user logs in the information processing device 30 by using the ID terminal 70.

Figure 7:
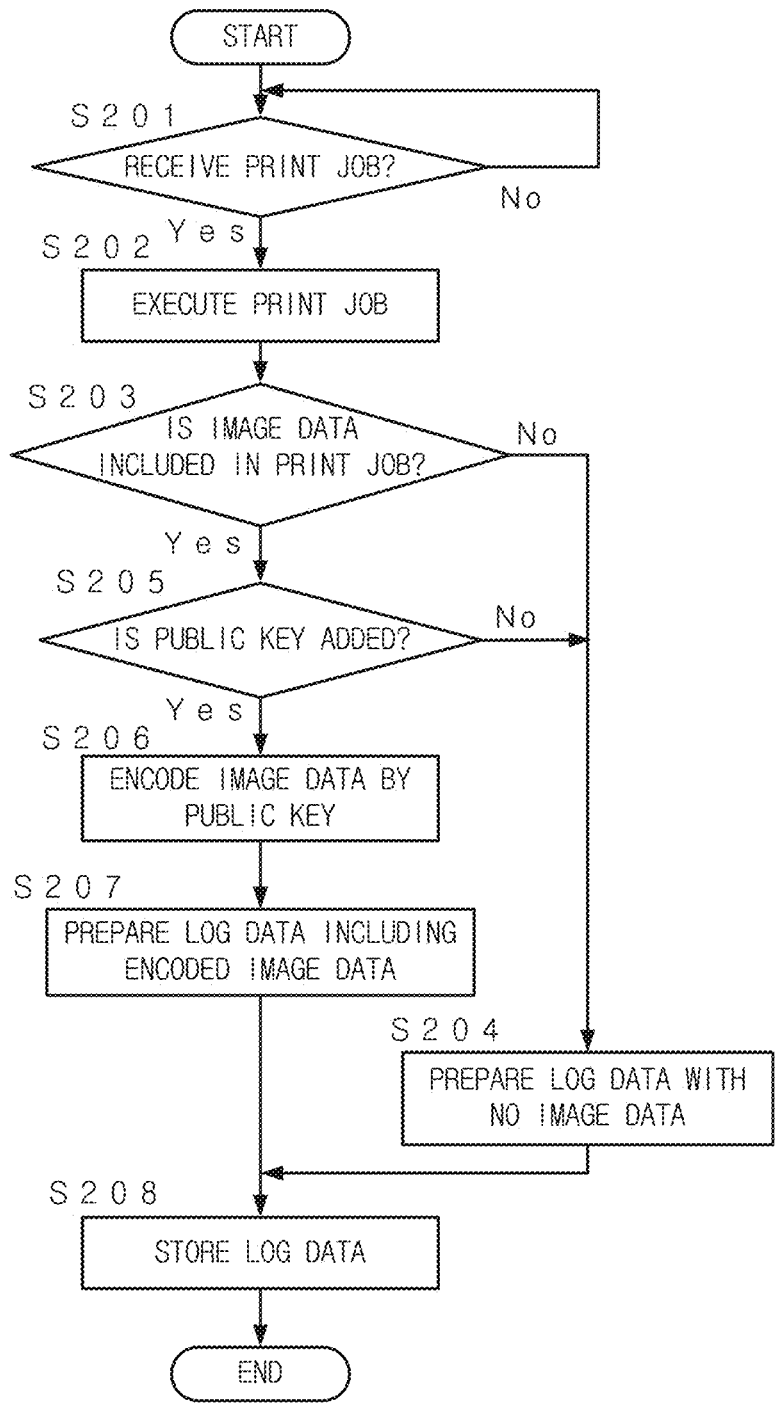
FIG. 7 is a flowchart showing the process which is carried out by the image forming apparatus which receives the print job from the information processing device according to the first embodiment.

FIG. 7 is a flowchart showing the process which is carried out by the image forming apparatus 10 which receives the print job from the information processing device 30. When the image forming apparatus 10 receives the print job (Step S201; Yes), the image forming apparatus 10 executes the printing in accordance with the print job (Step S202). Then, the image forming apparatus 10 prepares and stores the log data relating to the printing (Step S203 to Step S209).

In detail, the image forming apparatus 10 judges whether the image data is included in the executed print job (Step S203). In case that the image data is not included (Step S203; No), the image forming apparatus 10 prepares the log data which does not include the image data (Step S204). Then, the process proceeds to Step S208. In this log data, the information, such as the printing date and time, the number of printed sheets, color/monochrome printing, the user who instructs the printing (user ID) and the like, is included.

In case that the image data is included in the executed print job (Step S203; Yes), the image forming apparatus 10 checks whether the public key is added to the print job which is executed in Step S202 (Step S205). In case that the public key is added to the print job (Step S205; Yes), the image forming apparatus 10 creates the encoded image data by encoding the image data included in the print job by using the public key (Step S206), and prepares the log data including the encoded image data (Step S207). Then, the process proceeds to Step S208. In the log data, the encoded image data is included in addition to the log data prepared in Step S204.

In case that the public key is not added to the print job executed in Step S202 (Step S205; No), the image forming apparatus 10 prepares the log data which does not include the image data (Step S204). Then, the process proceeds to Step S208.

In Step S208, the image forming apparatus 10 transmits the log data to the log storing server 50 to store the log data in the log storing server 50. Then, the process is ended. Instead of the transmission of the log data to the log storing server 50, the image forming apparatus 10 may store the log data in the internal storing device (storage) thereof.

Figure 8:
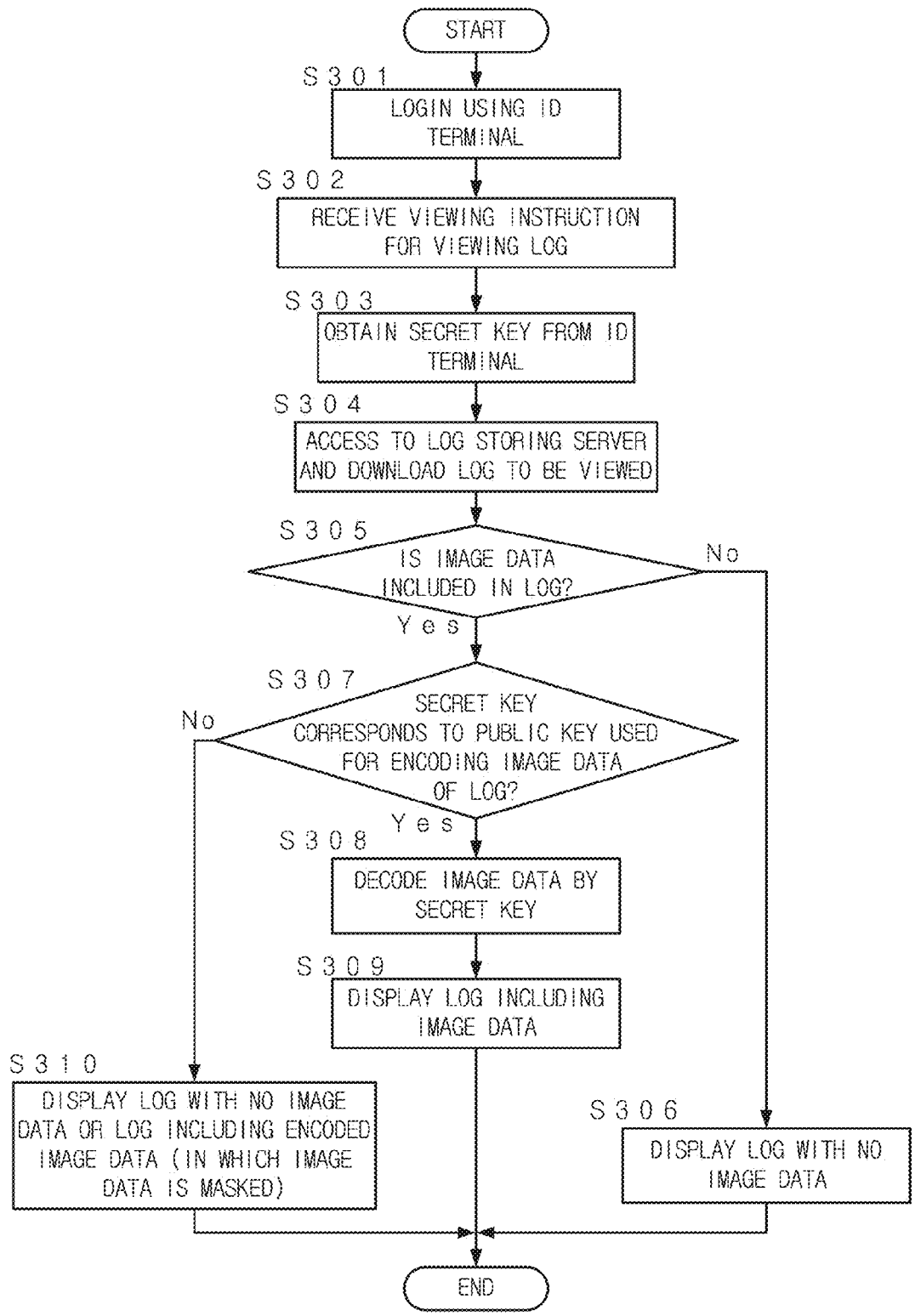
FIG. 8 is a flowchart showing the process relating to the view of the log, which is carried out by the information processing device according to the first embodiment.

FIG. 8 is a flowchart showing the process relating to the view of the log, which is carried out by the information processing device 30. When the information processing device 30 receives the login operation using the ID terminal 70 from the user, the information processing device 30 receives the user ID from the ID terminal 70 and accepts the login of the user having the received user ID (Step S301).

When the information processing device 30 receives the log viewing instruction including the designation of the log data to be viewed, from the user who logs in by using the ID terminal (Step S302), the information processing device 30 obtains the secret key from the ID terminal 70 of the user who logs in (Step S303). Alternatively, the information processing device 30 may obtain the secret key from the ID terminal 70 when the user logs in the information processing device 30 by using the ID terminal 70.

The information processing device 30 accesses to the log storing server 50, transmits the request for downloading the log data designated in Step S302, to the log storing server 50, and obtains the designated log data from the log storing server 50 by downloading the log data (Step S304). The information processing device 30 judges whether the obtained log data includes the image data (Step S305). In case that the image data is not included (Step S305; No), the information processing device 30 displays the log information which does not include the image, in accordance with the obtained log data (Step S306). Then, the process is ended. In the log information, the information, such as the printing date and time, the number of printed sheets, color/monochrome printing, the user who instructs the printing (user ID) and the like, is included, but the printed image is not included.

In case that the log data obtained in Step S304 includes the image data (the encoded image data) (Step S305; Yes), the information processing device 30 checks whether the secret key obtained in Step S303 corresponds to the public key used for encoding the image data, that is, whether the secret key can decode the encoded image data (Step S307).

In case that the secret key obtained in Step S303 corresponds to the public key used for encoding the image data included in the log data (Step S307; Yes), the information processing device 30 decodes the encoded image data by using the secret key (Step S308). The information processing device 30 displays the log information which includes the image based on the decoded image data (Step S309). Then, the process is ended. In the log information, the image based on the decoded image data and the information, such as the printing date and time, the number of printed sheets, color/monochrome printing, the user who instructs the printing (user ID) and the like, is included.

In case that the secret key obtained in Step S303 does not correspond to the public key used for encoding the image data included in the log data (Step S307; No), the information processing device 30 displays the log information which does not include the image or the log information in which the image corresponding to the encoded image data is masked (Step S311). Then, the process is ended. In the log information, the information, such as the printing date and time, the number of printed sheets, color/monochrome printing, the user who instructs the printing (user ID) and the like, is included. The log information is displayed so as not to include the image. Alternatively, the log information is displayed by masking the portion corresponding to the image which could be obtained by decoding the encoded image data if the secret key corresponding to the public key was obtained.

In case that the log data is stored in the image forming apparatus 10, the information processing device 30 accesses to the image forming apparatus 10 to obtain the log data.

Figure 9:
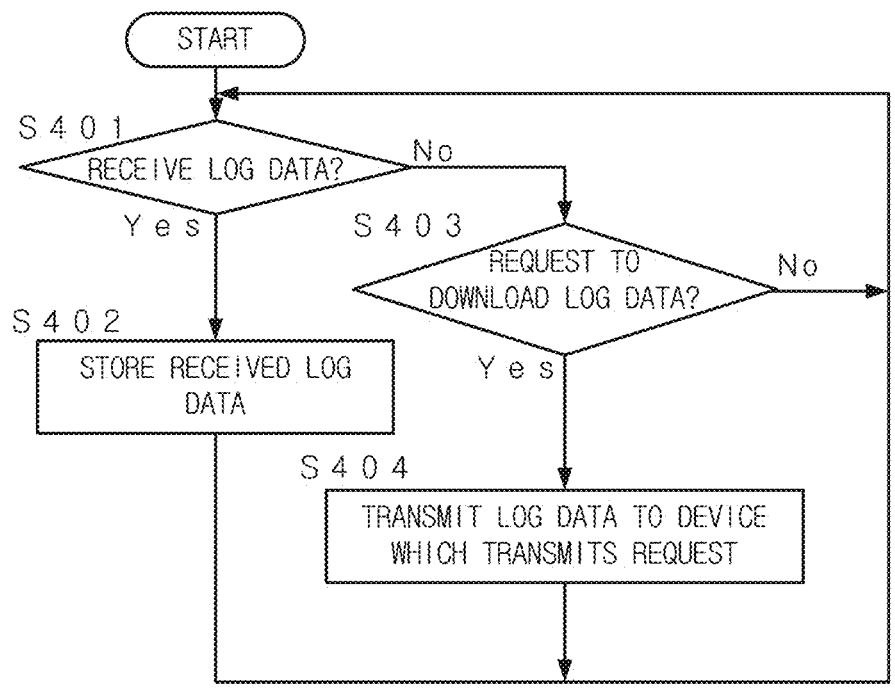
FIG. 9 is a flowchart showing the process which is carried out by the log storing server.

FIG. 9 is a flowchart showing the process which is carried out by the log storing server 50. When the log storing server 50 receives the log data from the image forming apparatus 10 (Step S401; Yes), the log storing server 50 stores the received log data (Step S402). Then, the process returns to Step S401. When the log storing server 50 receives the request for downloading the log data (Step S403; Yes), the log storing server 50 transmits the designated log data to the information processing device 30 which transmits the above request (Step S404). Then, the process returns to Step S401.

As described above, in the image forming system 5 according to the first embodiment, in case that the user who instructs the printing views the log data relating to the printing, the log information including the printed image is displayed. On the other hand, in case that a person except the user who instructs the printing, such as an administrator or the like, views the log data relating to the printing, the log information in which the image is not included or in which the image is masked is displayed because the secret key corresponding to the public key used for encoding the image data included in the log data is not obtained.

Further, because the image data is automatically encoded, it is not necessary to designate the part to be concealed. It is possible to avoid the situation in which a user forgets to designate the portion to be concealed and the important part is not encoded.

Further, because the public key and the secret key are managed by using the ID terminal 70 which becomes effective in accordance with the biological information or the like only when the predetermined user uses the ID terminal 70, even though the ID terminal 70 is stolen by another person, it is not possible to impersonate the predetermined user. As a result, it is possible to secure the high security.

Next, the second embodiment will be explained.

In the second embodiment, the user who is allowed to execute the printing (output) is designated in the print job and the printing which is executed by a user except the user who is allowed to execute the printing is prohibited, that is the security printing is executed. When the image forming apparatus 10 receives the print job in which the user who is allowed to execute the printing is designated, the image forming apparatus 10 does not execute the print job immediately and stores the print job in the internal memory. Then, in case that the user who is allowed to execute the printing is successfully authenticated by using the ID terminal 70, the image forming apparatus 10 executes the printing in accordance with the print job.

In case of the security printing, because the user logs in the image forming apparatus 10 by using the ID terminal 70 at the printing, the image forming apparatus 10 obtains the public key at this time. That is, in the second embodiment, the public key is not added to the print job to be transmitted to the image forming apparatus 10 from the information processing device 30, and when the user who is allowed to execute the printing logs in the image forming apparatus 10, the image forming apparatus 10 obtains the public key from the ID terminal 70 of the user who logs in. Thereby, as compared with the first embodiment in which the public key is transmitted with the print job via the network, it is possible to reduce the risk of the leak of the public key and to improve the security.

Figure 10:
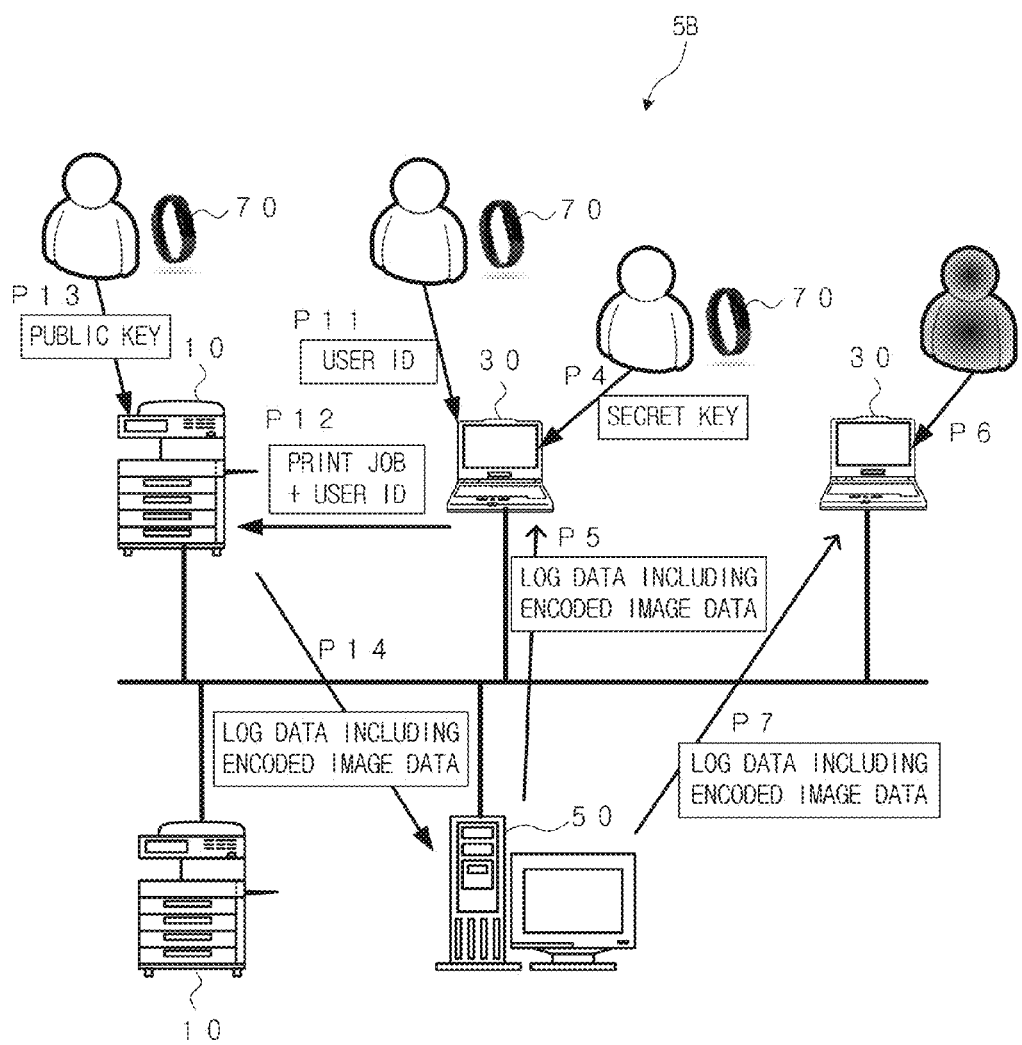
FIG. 10 shows the sequence in which a document is printed and the log information is viewed in the image forming system according to the second embodiment.

FIG. 10 shows the sequence in which a document is printed and the log information is viewed in the image forming system 5B according to the second embodiment. A user logs in the information processing device 30 by using the user's ID terminal 70. The information processing device 30 reads the user ID from the ID terminal 70 of the user who logs in (P11). When the user designates the print data to be used for the printing and the image forming apparatus 10 as the print destination, the information processing device 30 prepares the print job for executing the printing in accordance with the designated print data. In the print job, the user having the read user ID is designated as the user who is allowed to execute the printing. The information processing device 30 transmits the print job to the image forming apparatus 10 which is designated as the print destination (P12).

The image forming apparatus 10 stores the received print job in the internal memory thereof. When the user who is allowed to execute the printing in the print job, logs in the image forming apparatus 10 by using the user's own ID terminal 70, the image forming apparatus 10 executes the printing in accordance with the print job and reads the public key from the ID terminal 70 of the user who logs in (P13). Then, the image forming apparatus 10 creates the encoded image data by encoding the image data included in the print job by using the public key, prepares the log data including the encoded image data and transmits the log data to the log storing server 50 (P14). The subsequent process is the same as that of P4 to P7 shown in FIG. 1, and the explanation thereof is omitted.

Figure 11:
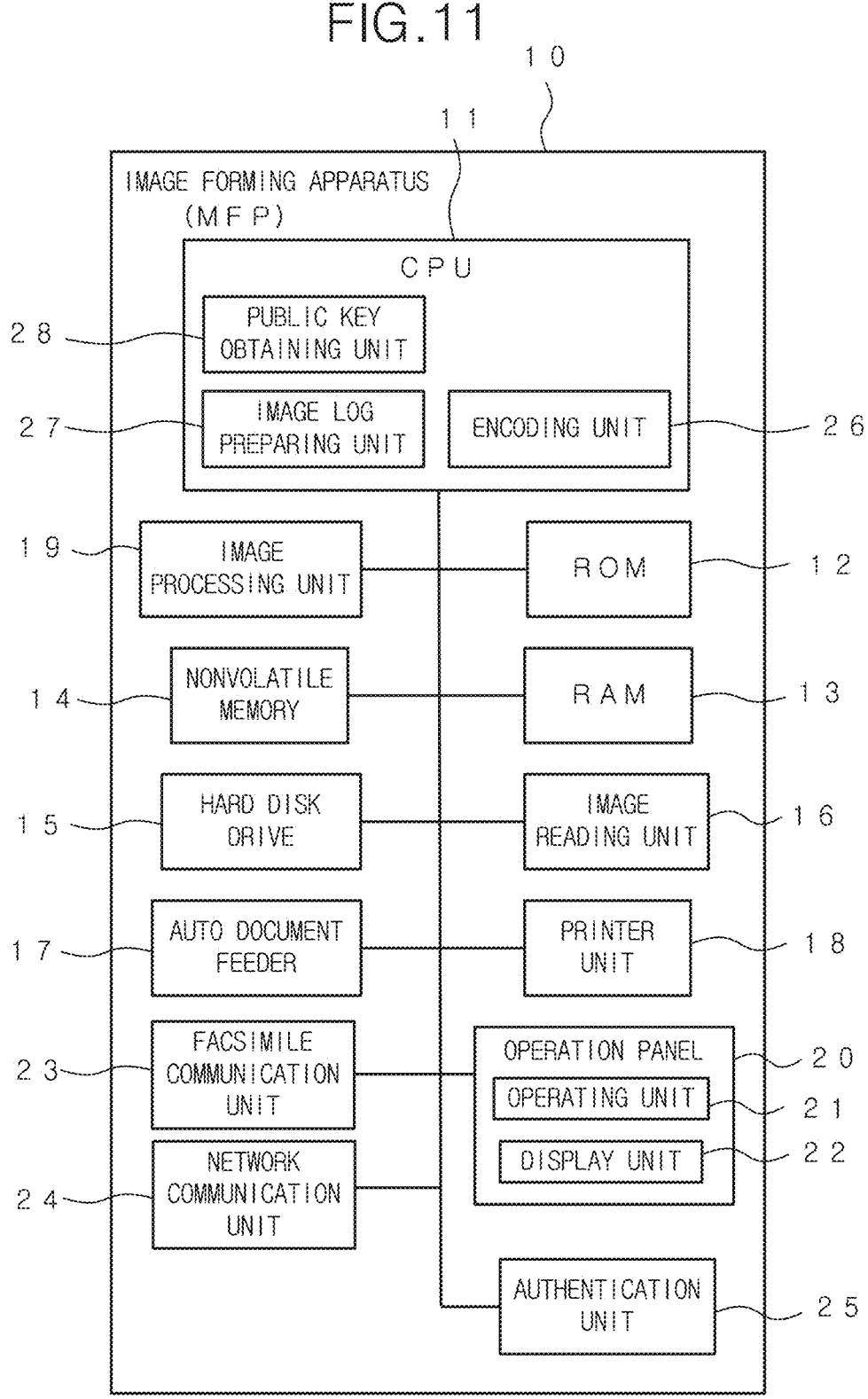
FIG. 11 is a block diagram showing the schematic configuration of the image forming apparatus according to the second embodiment.

FIG. 11 is a block diagram showing the schematic configuration of the image forming apparatus 10 according to the second embodiment. The elements which are the same as those of the image forming apparatus 10 shown in FIG. 2 are denoted by the same numeral references, and the explanation thereof is omitted. The CPU 11 further has the function as the public key obtaining unit 28. The public key obtaining unit 28 has the function for obtaining the public key from the ID terminal 70 of the user who logs in image forming apparatus 10.

Figure 12:
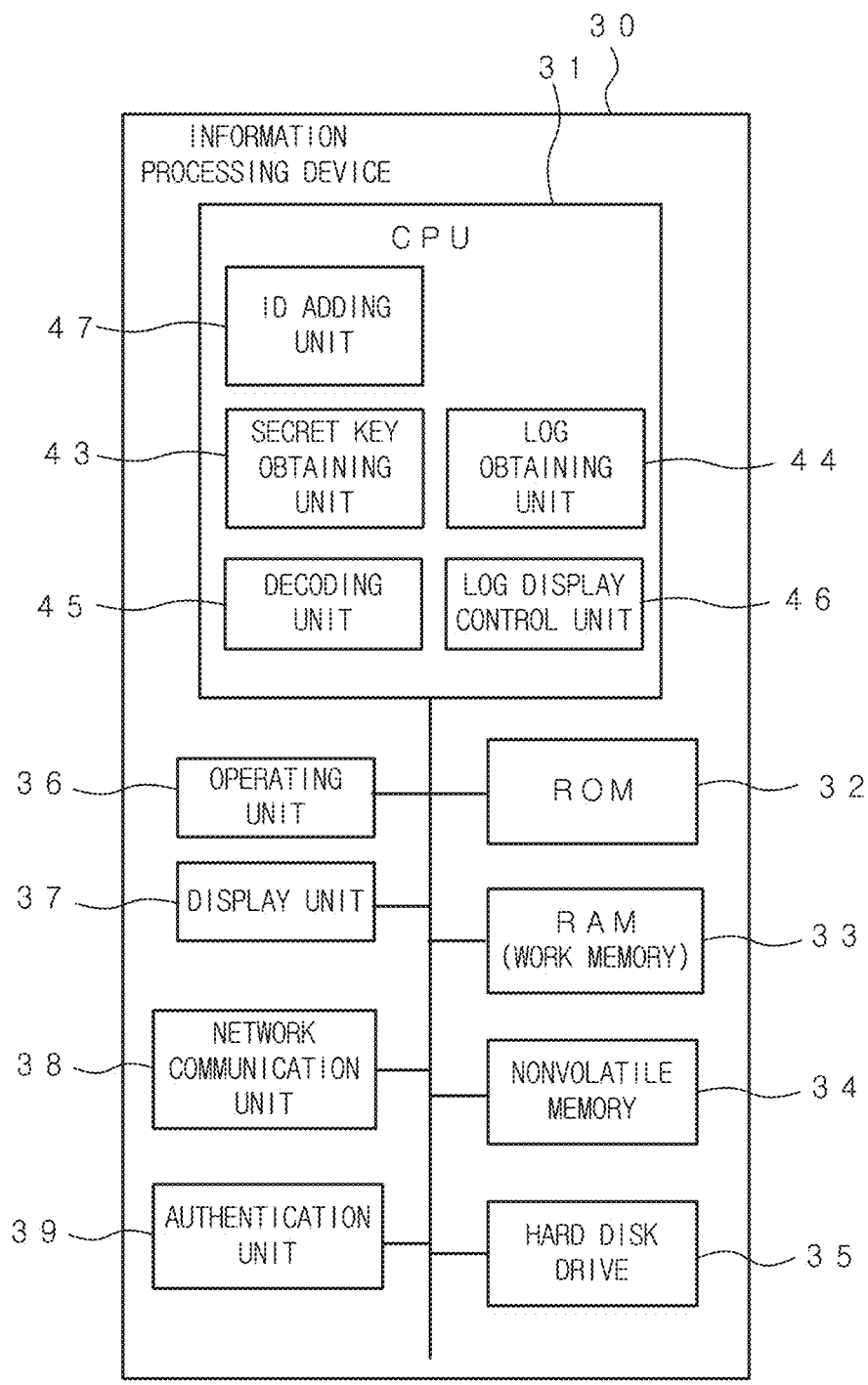
FIG. 12 is a block diagram showing the schematic configuration of the information processing device according to the second embodiment.

FIG. 12 is a block diagram showing the schematic configuration of the information processing device 30 according to the second embodiment. The elements which are the same as those of the information processing device 30 shown in FIG. 3 are denoted by the same numeral references, and the explanation thereof is omitted. The CPU 31 has the function as the ID adding unit 47 instead of the public key obtaining unit 41 and the public key adding unit 42 provided in the information processing device 30 according to the first embodiment. The ID adding unit 47 has the function for preparing the print job in which the user having the user ID obtained from the ID terminal 70 used for the login is designated as the user who is allowed to the execute the printing by authenticating the user in the authentication unit 39.

Figure 13:
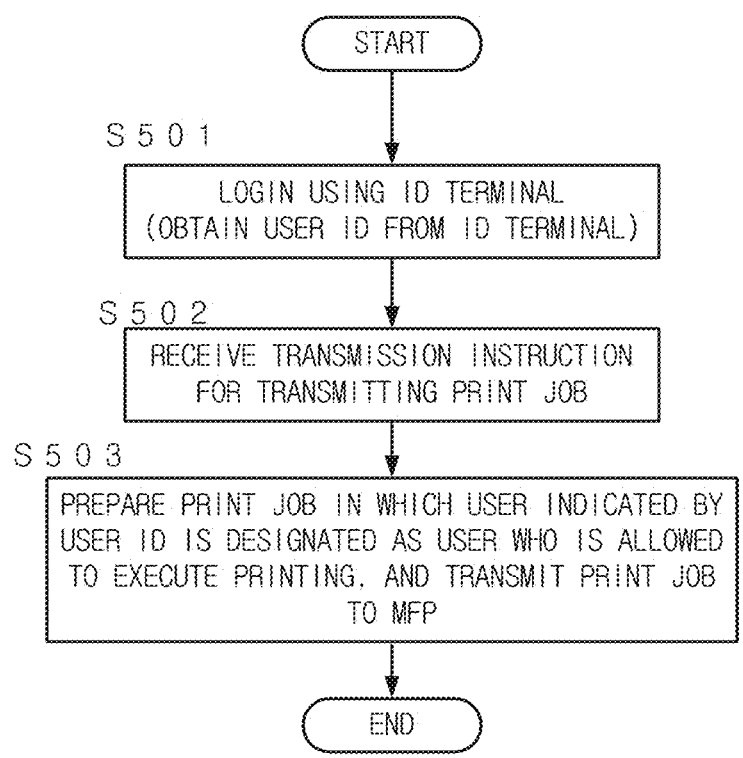
FIG. 13 is a flowchart showing the process relating to the transmission of the print job, which is carried out by the information processing device according to the second embodiment.

FIG. 13 is a flowchart showing the process relating to the transmission of the print job, which is carried out by the information processing device 30 according to the second embodiment. When the information processing device 30 receives the login operation using the ID terminal 70 from the user, the information processing device 30 receives the user ID from the ID terminal 70 and accepts the login of the user having the received user ID (Step S501).

The information processing device 30 receives the designation of the print data to be printed and the image forming apparatus 10 as the print destination, and further receives the transmission instruction for transmitting the print job for printing the print data, from the user who logs in the information processing device 30 by using the ID terminal 70 (Step S502). Then, the information processing device 30 prepares the print job in which the user having the user ID obtained in Step S501 (the user who logs in) is designated as the user who is allowed to execute the printing, and transmits the print job to the image forming apparatus 10 designated as the print destination (Step S503).

FIG. 14 is a flowchart showing the process which is carried out by the image forming apparatus 10 which receives the print job from the information processing device 30 according to the second embodiment. When the image forming apparatus 10 receives the print job (Step S601; Yes), the image forming apparatus 10 stores the received print job in the internal memory (Step S602).

When the image forming apparatus 10 receives the login operation using the ID terminal 70 (Step S603; Yes), the image forming apparatus 10 obtains the user ID from the ID terminal 70 (Step S604). Then, the image forming apparatus 10 judges whether the print job in which the user having the obtained user ID (the user who logs in) is designated as the user who is allowed to execute the printing, is stored (Step S605). In case that the image forming apparatus 10 does not store the above print job (Step S605; No), the process is ended.

In case that the print job in which the user having the user ID obtained from the ID terminal 70 is designated as the user who is allowed to execute the printing, is stored (Step S605; Yes), the image forming apparatus 10 executes the printing in accordance with the print job (Step S606) and obtains the public key from the ID terminal 70 used for the login (Step S607). Alternatively, the public key may be obtained when the user logs in the image forming apparatus 10 by using the ID terminal 70.

Then, the image forming apparatus 10 prepares and stores the log data relating to the printing executed in Step S606 (Step S608 to Step S612). In detail, the image forming apparatus 10 judges whether the image data is included in the executed print job (Step S608). In case that the image data is not included (Step S608; No), the image forming apparatus 10 prepares the log data which does not include the image data (Step S609). Then, the process proceeds to Step S612. In this log data, the information, such as the printing date and time, the number of printed sheets, color/monochrome printing, the user who instructs the printing (user ID) and the like, is included.

In case that the image data is included in the executed print job (Step S608; Yes), the image forming apparatus 10 creates the encoded image data by encoding the image data by using the public key obtained in Step S607 (Step S610), and prepares the log data including the encoded image data (Step S611). Then, the process proceeds to Step S612. In the log data, the encoded image data is included in addition to the log data prepared in Step S609.

In Step S612, the image forming apparatus 10 transmits the log data to the log storing server 50 to store the log data in the log storing server 50. Then, the process is ended. Alternatively, the image forming apparatus 10 may store the log data in the internal storing device (storage) thereof.

The operation relating to the view of the log, which is shown in FIG. 8 and the operation of the log storing server 50, which is shown in FIG. 9 are the same as those of the second embodiment, and the explanation thereof is omitted.

As described above, in the second embodiment, the public key is not added to the print job to be transmitted from the information processing device 30 to the image forming apparatus 10. When the user who is allowed to execute the printing logs in the image forming apparatus 10 by using the ID terminal 70, the image forming apparatus 10 obtains the public key from the ID terminal 70 and encodes the image data. Therefore, as compared with the first embodiment, it is possible to reduce the risk of the leak of the public key and to improve the security.

Embodiments of the present invention were explained above with reference to the drawings. However, the concrete configuration of the present invention is not limited to the embodiments. In the present invention, various modifications of the embodiments or the addition of various functions or the like to the embodiments can be carried out without departing from the gist of the invention.

Even though the security printing is executed, the public key may be added to the print job to be transmitted from the information processing device 30 to the image forming apparatus 10. Further, the image forming apparatus 10 may encode the image data by using the public key added to the print job.

In at least one of the embodiments, the log data is prepared after the printing. However, the log data may be prepared when it is confirmed that the printing will be executed. Then, after the log data is prepared, the print may be executed.

In the information processing device 30, after the user logs in the information processing device 30 by using the ID terminal 70, when the application program (for example, the printer driver) for transmitting the print job to the image forming apparatus 10 or for viewing the log is started up, the public key and/or the secret key may be obtained from the ID terminal 70 by the above application program.

In at least one of the embodiments, as the user except the user who transmits the print job to the image forming apparatus 10, an administrator who manages the rental fee (charge) of each image forming apparatus 10 in a rental office or the like, is exemplified. The user except the user who transmits the print job to the image forming apparatus 10 is not limited to this.

The method for carrying out the user authentication by using the ID terminal 70 is not limited to the method in which the biological information is used. The method for preventing another user from impersonating the user who is allowed to execute the printing can be carried out by using the ID terminal 70.

A portable terminal, such as a tablet, a smart phone or the like may function as the ID terminal 70. For example, in case that a user carries out the transmission operation for transmitting the print job while the user touches the detection pad of the portable terminal, such as a tablet, a smart phone or the like by using the user's finger or the like in order to execute the fingerprint authentication or the vein authentication, the portable terminal transmits the print job to which the public key stored in the portable terminal is added, to the image forming apparatus 10 designated as the print destination. In case that the user inputs the viewing instruction for viewing the log while the user touches the detection pad, the portable terminal may decode the encoded image data by using the secret key stored in the portable terminal.

In at least one of the embodiments, only when a user having the ID terminal is the predetermined user, the public key and the secret key stored in the ID terminal are outputted. When the information processing device receives the transmission instruction for transmitting the print data from the user having the ID terminal, the information processing device transmits the print job to which the public key obtained from the ID terminal is added, to the image forming apparatus. In case that the image forming apparatus executes the print job, the image forming apparatus prepares the log data in which the image data is encoded by using the public key, and stores the log data in the storing device. In case that the predetermined user views the log data by using the ID terminal, the predetermined user can view the log information in which the encoded image data is decoded by using the secret key obtained from the ID terminal. On the other hand, because the log data except the image data is not encoded, an administrator or the like who is not the predetermined user and who does not have the secret key corresponding to the public key can view the log data except the image data. Further, because the image data is automatically encoded, it is not necessary to set the concealed portion individually.

In at least one of the embodiments, only when a user having the ID terminal is the predetermined user, the public key and the secret key stored in the ID terminal are outputted. In case that the image forming apparatus successfully authenticates an allowed user who is allowed to execute the printing by using the ID terminal, the image forming apparatus executes the printing in accordance with a print job in which the allowed user is designated. Further, when the printing is executed, the image forming apparatus prepares the log data in which the image data is encoded by using the public key obtained from the ID terminal, and the stores the log data. In case that the allowed user views the log data by using the ID terminal, the allowed user can view the log information in which the encoded image data is decoded by using the secret key obtained from the ID terminal. On the other hand, because the log data except the image data is not encoded, an administrator or the like who is not the allowed user and who does not have the secret key corresponding to the public key can view the log data except the image data. Further, because the image data is automatically encoded, it is not necessary to set the concealed portion individually.

In at least one of the embodiments, the ID terminal authenticates the user by using the biological information of the user.

In at least one of the embodiments, the log data is stored in the storing device (storage) provided in the image forming apparatus.

According to the image forming system and the print log management method, it is possible to prepare the log in which the concealed portion is encoded so that only a person who prints the document can decode the encoded portion.

Although embodiments of the present invention have been described and illustrated in detail, it is clearly understood that the same is by way of illustration and example only and not limitation, the scope of the present invention should be interpreted by terms of the appended claims.

What is claimed is:

1. An image forming system, comprising:
   an ID terminal that stores a public key and a secret key unique to a user ID, and that outputs the public key and the secret key to an external device when the ID terminal authenticates a user permitted to use an image data;
   an image forming apparatus that prepares a log data relating to printing;
   a storing device that stores the log data prepared by the image forming apparatus;
   an information processing device that authenticates the user by using the ID terminal; and
   a log viewing device that authenticates the user by using the ID terminal, wherein
   when the information processing device receives a print instruction for printing a predetermined print data from the authenticated user, the information processing device transmits a print job to which the public key obtained from the ID terminal is added, to the image forming apparatus,
   the image forming apparatus receives the print job to which the public key is added, executes the printing in accordance with the print job, creates an encoded image data by encoding the image data included in the print job by using the public key, prepares the log data including the encoded image data, and stores the log data in the storing device,
   the log viewing device obtains the log data to be viewed by the authenticated user from the storing device, decodes the encoded image data included in the log data, and outputs log information based on the log data,
   the ID terminal authenticates the user when biological information obtained from the user corresponds to the user ID,
   if the log viewing device successfully decodes the encoded image data using the secret key obtained from the ID terminal where the authenticated user is logging into, the log viewing device displays the log information with a print image of the encoded image data, and
   if the log viewing device does not successfully decode the encoded image data using the secret key, the log viewing device displays the log information without the print image of the encoded image data or with a masked print image of the encoded image data.

2. The image forming system of claim 1, wherein the log information includes information relating to the user who instructs the printing in accordance with the print job, number of printed sheets, and date and time of the printing.

3. The image forming system of claim 1, wherein the storing device is incorporated in the image forming apparatus.

4. The image forming system of claim 1, wherein the storing device is a server that is separate from the image forming apparatus.

5. The image forming system of claim 1, wherein the ID terminal authenticates the user only when the ID terminal is worn or held by the user.

6. An image forming system, comprising:
   an ID terminal that stores a public key and a secret key unique to a user ID, and that outputs the public key and the secret key to an external device when the ID terminal authenticates a user permitted to use an image data;
   an image forming apparatus that authenticates the user by using the ID terminal and prepares a log data relating to printing;

a storing device that stores the log data prepared by the image forming apparatus; and
a log viewing device that authenticates the user by using the ID terminal, wherein
in a case where the image forming apparatus successfully authenticates the user who is permitted to execute the printing by using the ID terminal, the image forming apparatus executes the printing in accordance with a print job in which the permitted user is designated, obtains the public key from the ID terminal, creates an encoded image data by encoding the image data included in the print job by using the public key, prepares a log data including the encoded image data, and stores the log data in the storing device,
the log viewing device obtains the log data to be viewed by the authenticated user from the storing device, decodes the encoded image data included in the log data, and outputs log information based on the log data,
the ID terminal authenticates the user when biological information obtained from the user corresponds to the user ID,
if the log viewing device successfully decodes the encoded image data using the secret key obtained from the ID terminal in which the authenticated user is logging, the log viewing device displays the log information with a print image of the encoded image data, and
if the log viewing device does not successfully decode the encoded image data using the secret key, the log viewing device displays the log information without the print image of the encoded image data or with a masked print image of the encoded image data.

7. The image forming system of claim 6, wherein the log information includes information relating to the user who instructs the printing in accordance with the print job, number of printed sheets, and date and time of the printing.

8. The image forming system of claim 6, wherein the storing device is incorporated in the image forming apparatus.

9. The image forming system of claim 6, wherein the storing device is a server that is separate from the image forming apparatus.

10. The image forming system of claim 6, wherein the ID terminal authenticates the user only when the ID terminal is worn or held by the user.

11. A print log management method, comprising:
transmitting a print job to which a public key unique to a user ID and obtained from an ID terminal is added, from an information processing device that authenticates a user permitted to use an image data by using the ID terminal to an image forming apparatus, when the information processing device receives a print instruction for printing a predetermined print data from the user who is successfully authenticated by using the ID terminal, wherein the ID terminal stores the public key and a secret key unique to the user ID, and output the public key and the secret key to an external device when the ID terminal authenticates the user, and the ID terminal authenticates the user when biological information obtained from the user corresponds to the user ID;
receiving the print job to which the public key is added and executing a printing in accordance with the print job by the image forming apparatus, further creating an encoded image data by encoding the image data included in the print job by using the public key, preparing a log data including the encoded image data and storing the log data in a predetermined storing device, by the image forming apparatus;
obtaining the log data to be viewed by the authenticated user, from the storing device, decoding the encoded image data included in the log data, and outputting log information based on the log data, by a log viewing device that authenticates the user by using the ID terminal;
if the encoded image data are successfully decoded using the secret key obtained from the ID terminal in which the authenticated user is logging, displaying the log information with a print image of the encoded image data; and
if the encoded image data are not successfully decoded using the secret key, displaying the log information without the print image of the encoded image data or with a masked print image of the encoded image data.

12. The print log management method of claim 11, wherein the ID terminal authenticates the user only when the ID terminal is worn or held by the user.

13. A print log management method, comprising:
receiving a print job in which a permitted user who is permitted to execute a printing is designated, by an image forming apparatus that authenticates the permitted user by using an ID terminal and prepares a log data relating to the printing, wherein the ID terminal stores a public key and a secret key unique to a user ID, and outputs the public key and the secret key to an external device when the ID terminal authenticates the permitted user, and the ID terminal authenticates the user when biological information obtained from the user corresponds to the user ID;
executing the printing in accordance with the print job in which the permitted user is designated, by the image forming apparatus in a case where the image forming apparatus successfully authenticates the permitted user by using the ID terminal;
obtaining the public key from the ID terminal, creating an encoded image data by encoding an image data included in the print job by using the public key, preparing a log data including the encoded image data and storing the log data in a predetermined storing device, in a case where the image forming apparatus executes the printing in accordance with the print job;
obtaining the log data to be viewed by the authenticated user, from the storing device, decoding the encoded image data included in the log data, and outputting log information including an image obtained by decoding the encoded image data, as the log information based on the log data, by a log viewing device that authenticates the user by using the ID terminal;
if the encoded image data are successfully decoded using the secret key obtained from the ID terminal in which the authenticated user is logging, displaying the log information with a print image of the encoded image data; and
if the encoded image data are not successfully decoded using the secret key, displaying the log information without the print image of the encoded image data or with a masked print image of the encoded image data.

14. The print log management method of claim 13, wherein the ID terminal authenticates the user only when the ID terminal is worn or held by the user.

* * * * *